United States Patent [19]

Schumacher

[11] Patent Number: 4,942,527

[45] Date of Patent: Jul. 17, 1990

[54] COMPUTERIZED MANAGEMENT SYSTEM

[76] Inventor: Billy G. Schumacher, P.O. Box 2184, Norman, Okla. 73069

[21] Appl. No.: 131,897

[22] Filed: Dec. 11, 1987

[51] Int. Cl.$^5$ ............................................. G06F 15/21
[52] U.S. Cl. .................................................... 364/401
[58] Field of Search .......................... 364/400, 401, 408

Primary Examiner—Clark A. Jablon
Attorney, Agent, or Firm—Hubbard, Thurman, Turner, Tucker & Harris

[57] ABSTRACT

A computing apparatus for an improved information system that manages. The apparatus has computing machinery which includes a computer and an input/output device for two way communication between the computer and an operator. The computer includes operating instructions for: receiving information from an operator during a management emergence stage necessary for developing a plan in machine readable language for an objective (task/service); processing the plan through a management convergence stage for generating subdivisional plans for output to an operator and receiving performance information as feedback for reducing the objective to a reality; processing the management information and feedback information obtained during the emergence and convergence stages through a proliference stage for generating specifications and quantitative goals for a new version of the objective for processing through the emergence and convergence stages; and processing the accumulated management related data including the feedback through a divergence stage for producing new organizational policy.

8 Claims, 5 Drawing Sheets

COMPUTERIZED MANAGEMENT SYSTEM

This invention relates to computerized artificial intelligence system and more particularly to a computing apparatus for an improved information system that manages.

BACKGROUND OF THE INVENTION

In the past, management as a discipline has been considered a social science rather than a universal science. As a social science three problems of management exist. First, there is a lack of acceptable definitions of terms. Secondly, there is an ignorance of the breadth of the history of management. Thirdly, there exists unworkable management theory. As management developed as a social science, these problems falsely confirmed the belief that successful management is subject to human uniqueness. While in fact, management based on anthropocentrism added problems because, for example, (1) many managers lacked understanding of the management processes, (2) vested interests pervade the decision process, as a result of the prepotent need for self and group protection when the measures of efficiency and effectiveness are concerned, and (3) the imposition of group norms to control production are not subject to positive control.

Recognition that management, as a discipline, has not in theory or in practice sought to connect its principles to those of other sciences has led to the clashing of the social sciences and particularly the life sciences on the neutral ground of human behavior. The field of contention is over the relationship of nature and nurture or, in traditional terms, heredity and culture.

The seeds for a scientific method in management were planted in the nineteenth century, they blossomed into literature during the emergent period 1900–1925 with Frederick W. Taylor's 1903 publication entitled "Shop Management". The convergent period 1925–1950 concentrated initially upon the use of the scientific method to study groups of people in the work place. The focus for this period was the private sector, but the locus of the researchers was academe. The use of the academic laboratory in addition to the work place as a clinical practice area for the human biologic sciences resulted in the eventual establishment of the case method at the Harvard Business School in contrast to the more traditional social, historical approach of economics.

World War II changed the focus of the application of science to management. Military organizations are historically and paradigmatically the first large-scale instance of management. This war created organizations, with their commensurate problems of world-wide proportions. The electronic data processing computer, with its future management potential, came out of the war effort.

The proliferent period 1950–1975 found vigorous competition among corporations to fill or enlarge their niches resulting in a positive approach in computer development. The computer could give a clerical informational advantage to organizations dealing with either world-wide or local problems.

The first electronic digital computer was designed and fabricated by Atanasoff and Berry at Iowa State College in 1937–1938. In 1946, Mauchly and Eckert completed the first large-scale computer, called the Electronic Numerical Integrator and Computer (ENIAC). All such devices lacked the unique capability of the stored program concept—the ability to internalize its own administration. This is the real dividing point between the mechanical/electrical devices and the electronic computer. John Von Neumann's 1945 discovery is the fall line between the automatic data processor (ADP) and the electronic data processor (EDP). Now a machine could be programmed to administer its own operations.

Computer programs are divided into two classes. The general problem-solving type is called a systems program while the specific problem-solving collection of instructions is classified as an application program. The most fundamental systems program, which serves as an interface between machine and user, is called a language. Its prepotency can be related to the hardware evolution.

| LANGUAGES | HARDWARE |
|---|---|
| Machine | Vacuum tube |
| Assembler/Compiler | Transistor |
| Interpreter | Integrated circuit (IC) |
| User-friendly | Very large scale IC (VSLI) |

As computer systems evolved, so did their management involvement. The electronic data processing computer with its future management potential came out of the World War II; efforts to handle on a large scale people, materials, and data necessitated attempts to codify the functions of management. These attempts were not altogether successful, but functions common to these attempts were planning, organizing, and controlling.

These efforts produced three effects on the computer of broad management significance. The first involved control and emphasized systems. In the 1950's, DuPont developed the Critical Path Method (CPM), and the Navy came up with Program Evaluation Review Technique (PERT). Both use network analyses. CPM identified the longest (time) series of work elements which could then receive management attention; PERT statistically set time goals and tracked their accomplishment. By the 1960's these types of control systems were widely used as computerized systems to evaluate time and sometimes money.

The second effect involved Operations Research (OR). Obviously, the computer was an ideal tool for dealing with OR Problems. It could handle the quantities of data and equations required by many large-scale efforts. As a result, OR ceased to utilize an interdisciplinary team approach and, instead, used a cookbook approach of applied computer programs.

The third effect precipitated the beginning of artificial intelligence. This field of computer science was pioneered in part by a behavioral management theorist, Herbert Simon. The goal, a general problems solver (GPS), was at that time far from completion. It did set the stage for the present interest in expert systems and other forthcoming computer advances having management significance.

The problem with these management systems as indicated above is that the systems were not general management problem solvers. A computerized general management problem solver must have a generic basis.

If one accepts the proposition that management as theory has already been repeatedly tested by nature, the science of management is an actuality. Not only is management a science—but science is management. Thus, going beyond the life sciences, the theory of evolution provides a management theory as follows:

The two principles of evolution are constancy and change. The proton of the atom can function alone as an emergent in a nucleus of hydrogen, whereas the single-strand ribonucleic acid (RNA) of the cell functions only as a coemergent. Nevertheless, they are concerned initially with the same operational principle-constancy. They both share change through gradual and eventually drastic mutation. Thus, if constancy and change are the principles of an operational universe, then emergence, convergence, proliference, and divergence are their characteristic actions or functions. Emergence and convergence are the functions of constancy, and proliference and divergence are the functions of change.

The general systems or parallel units of these functional relationships are alike in that one word, attraction, describes the overall process of each; but they are different as to the outcomes. The operation general systems are: attraction (emergence), combination (convergence), recombination (proliference), and concentration (divergence).

The first observation of attraction should be the origin of management. Recently, such primordial attraction has been shown to take place at the subelementary particle level. This attraction capability of subelementary entities is the point at which certain "determination of the course of action" of matter occurred. A concentration of such quarks is associated with dissipative energy very soon after the Big Bang and resulted in particles as new states of matter. This determined course of action (along with the necessary energy to accomplish it) was informed in these new emergent particles. The particle, therefore, was self-informed as to its course of action concerning operational/support functions. Such a course of action or "scheme of doing" was common to all particles at birth; and at the instances of their emergence, attraction was initialed and in proper systematic order the combinations of convergence took place. In other words, the course of action was accomplished.

The predetermined course of action as accomplished consisted of the subfunctions of tasks of the work elements of convergence, plication/replication and combination (nucleosynthesis). The goal of the course of action is the product, in this case the configured means of constancy and change.

The tasks of convergence were accomplished as timely conditions dictated. The condition of the regular cooling from the temperature of the Big Bang to the present constitutes a universal clock. By using such cooling as the measure of time, the tasks of convergence can be ascertained as to initiation and cost in time. Further, the energy that is internal at the time of emergence can be measured as a participative cost during the tasks of convergence. Finally, the product of accomplishment can be measured as to quantity consisting of a given number of pairs of different entities in a one-to-one ratio. The quality of this product is definable as a given nucleus. From determination of the course action to the goal of a converged product, the pairings, or grouping occurred with certainty.

This certainty is weakened as the function of proliference puts the binary products or group forms at risk during recombination. Such invention includes not only reconfiguration of the binary product or group but also additional energization of a newly organized whole. Such energy is not the nucleus but rather external thereto. The resulting new organizations are tested until the fitter fills its niche and risk resolves back to certainty. Thus, invention and testing take place as the proliferent subfunctions or tasks consisting of renucleosynthesis/renurturation, energization, and eventual maturation of the fitter.

The timely initiation of these tasks is related to the overall universal cooling. The cost of time for the occurrence and recurrence of these tasks can also be calculated. Both the participative energy of the recombinant nucleus or recombinant group and the external energy can be calculated based on the kind and amount of force involved. In the case of the atom, the quantity and quality of the organized product are related. For example, as the number of nucleons increases, the kinds of elements, or quality, also change. The periodic table demonstrates this relationship of quantity and quality in a series of performed products. Thus, the performance factor may be described in this way: Quantity becomes quality in the atomic world; one electron more may lead to a complete change of properties. Therefore, the timely initiation of each task, the task cost in time, the participative energy cost per task, and the performance properties can be calculated in proliference (as in convergence) for the atom. The constant direction of time allows all the other proliference stages to complete the same risky tasks of reconfiguration and energization to certain maturity for those organizations that become fitter. Given, the same time (temperature) and the same energy involvement, both molecules and compounds composed of the same amount of the same elements will result in the same quantity and quality of product. Otherwise, chemistry would not be a science.

Risky invention resolves to certainty as testing results in the maturity of selected organizations. Further selection of the fittest of these organizations causes divergence resulting in tasks of decoupling, increased motility, and symbiosis to occur with certainty. The dissipative structure thesis accounts for all such concentrations which take place far from the equilibria of both convergence and proliference.

These concentrations in a localized area cause a redetermination of a course of action in a new layer and state of matter. Thus, the functional cycle of emergence, convergence, proliference, and divergence has resulted in the ever changing topology of mass.

From the above, the evolution of management through the first macro paradigm can be detailed as follows:

1. Beginning with the origin of management at the subelementary particle level, certain determination of a course of action takes place.
2. This course of action is accomplished and assured with certainty in part and, in whole, as to time, energy, and performance.
3. Inventions at risk are resolved to mature certainty by testing; the fitter are selected based on time, energy, and performance.
4. Certain coming together of the selected fittest results in a redetermination of a course of action for the next layer of management.

A cycle of course of action determination, accomplishment and assurance of accomplishment, invention and testing, maturation, and redetermination of a course of action is the pattern of management evolution for the primary universal paradigm (physics and physical chemistry).

The secondary universal paradigm (organic, chemistry, biology, and social sciences) in its microparadigms follows mostly the same cycle as the first, the exceptions involve:

1. The introduction of new information resulting in proliferent "uncertainty" as an antecedent to the risk of invention; and
2. The advent of specific organismic management beginning with group leadership and continuing through parental governance to the eventual appearance of human organizational management.

From the above it is apparent that management handles the initial and proper, subsequent relative order of the operational/support functions of the universe involving two principles. The first principle concerns the handling of constancy and is labeled administration, a word that usually means ministration to or stewardship. Its meaning, in conjunction with management, also denotes coordination.

The second principle that handles change is anticipation, which means the taking up of something before hand. While administration involves doing, anticipation involves what is to be done.

Based on these principles, the functions of administration involve the accomplishment of a previously determined course of action (implementation) and its assurance of accomplishment in whole or in part measured in time, energy, and performance (evaluation). The functions of anticipation involve the eventual certain determination of a course of action through the resolution of risk and uncertainty (basic, applied, development research and planning). It is the plan that is the contact point between administration and anticipational in today human organizations.

Plans are characterized by time and amount of detail. Short-term plans are called tactical; long-range, general plans are called strategic. The elements of a plan are: scope, work elements, time frame, resource allocation, summary (may be presented first), appendix, bibliography, and glossary.

The scope of the plan is a general statement about the state of the art, the nature of the problem (task), and the proposed solution expressed in goals and their surrogates. The word surrogate refers to the numbers that are required to identify the desired output in part and in whole. These are, of course, time, energy, and performance (quality specifications and quantity of outputs to be produced). Scope refers to the range of such goals or objectives.

The work elements is the initial deduction (output to input) of the manager presented inductively (input to output). These work elements are broken down into sequential stages and tasks. Such a series was typical of the industrial fabrication of physical products. A stage is a series of tasks performed one after another without a break in time. A task is a defined job that is performed by one or more human beings and/or machines without a break in time.

Time frame if the time for a task is not precisely known, then an estimate must be made. The activity time formulation is one approach that came out of PERT, i.e., $AT = (a + 4b + c)/6$, which estimates activity time by adding the most optimistic time (a) to four times the most likely time (b) to the most pessimestic time (c) and dividing the summation by 6.

Resource Allocation is a matrix showing the cost measured in money for mass/energy (human and material resources) by both stages and tasks and is called a performance budget. The total cost for all types of resources over the time of the plan is termed a line item budget. The word, overhead, refers to those overall costs of the organization that all work elements must share (taxes, general/administrative, profit or contingency expressed as percentages of time and materials).

The summary is a general statement of how the plan will succeed. Such a summary usually has public relations value as well.

The appendix includes the resumes of the persons involved and specifications of materials. The bibliography is the identification of the source of literary, field, and experimental data. And the glossary contains an inventory and definition of special terms.

As previously stated, administration is based on control. All the information necessary to develop such a system is found in the format of the plan. Like its universal predecessor, a control system must be cybernetic, heuristic, and assured. The control of a single leader is based on authority and is subject to the errors of such a person. Similarly, most industrial control systems depend on people and are equally limited. As human beings thwart positive control by inaccurately inputting the system or to other overt actions, the closed-loop aspect of control must be absolute if positive results are to be achieved.

Prior attempts to provide good cybernetic systems in project management met with varying degrees of success. One-time-only work elements were controlled more easily because group norms did not have time to be established. Other attempts were made to computerize management, one such attempt was performance budgeting established by Government Executive Order and known as the Planning, Programming Budgeting System. This effort sought to bring the system analysis process to strategic planning; however, the higher level control systems were rarely connected with the lower-level systems; the result was a failure owing to lack of cybernetics. In addition to control failure, because the higher-level systems were rarely connected to the lower-level systems, there was no positive feedback for problem solving. Without, feedback for problem solving there can be no heuristics and no possible evolution of the plan. Those persons skilled in the art desiring more information concerning the background of this invention are referred to B. G. Schumacher, "*On The Origin And Nature Of Management*", Eugnosis Press (1984, 1986).

SUMMARY OF THE INVENTION

Accordingly, it is an object of this invention to provide a computerized management apparatus having a socio-intelligence that is applicable to all organizations of humans and other machines including its own evolution.

Another object of the invention is to provide a computerized management system following the pattern favored by all assemblages or aggregations of evolutionary matter including atoms and their organic constructs of cells including the paradigm emergence of administration, convergence of administration and anticipation, proliferation of administration and anticipation throughout the organization, and divergence into new states of matter or organization.

Still another object of the invention is to provide a computerized management system having built in communication and control capability for management purposes.

Yet another object of the invention is to provide a computerized management apparatus having built-in positive feedback for self-educating capability.

Still yet another object of the invention is to provide a computerized management apparatus having an assured management system.

A further object of the invention is to provide a computer aided general problem solver for managing any human or machine organization.

Briefly stated the invention includes a computer aided dual system general problem solver for managing any human or machine organization. An instruction means connected to the computing means provides a first system of the dual system for implementing the principle of administration and is hereinafter referred to as the Alphus system. A second instruction means provides a second system of the dual system for implementing the principle of anticipation and is hereinafter referred to as the Beta system.

The functions of administration included in Alphus are implementation (I) and evaluation (E). The general system of administration is control.

The functions of anticipation included in Beta are basic research (B), applied research (A), development (D), and planning (P).

Thus, an automated, closed loop management apparatus assures the right action takes place at the right time and at the right cost in time and money (energy) to achieve the right quantity and quality of the right output (goods and/or services), with a feedback subjecting the efficiency and effectiveness of the output to change or redetermination by a process of discovery, invention, testing, and optimal selection for perfection. The change may be gradual or evolutionary as well as drastic or revolutionary to meet the demands of management.

BRIEF DESCRIPTION OF THE DRAWINGS

Other objects and features of the invention will become more readily apparent form the following detailed description when read in conjunction with the accompanying drawings, in which like reference numerals designate like parts throughout the figures thereof, and in which.

DESCRIPTION OF THE PREFERRED EMBODIMENT OF THE INVENTION

The computerized management system with simultaneous user capability 10 (FIG. 1) of the present invention includes a plurality of work stations 12, and a cabinet 14 for housing an expander 16 and one or more microprocessors 18. Each work station includes a monitor 20 and a keyboard 22. A plurality of printers 24 are provided for the work stations. The printers may or may not be located at each work station. The monitors and keyboards are typical color monitors and keyboards such as, for example those sold by the International Business Machine Corporation. The expansion unit 16, is, for example, an MPC-8 Expansion Unit sold by Anex Technologies.

Figure 1:
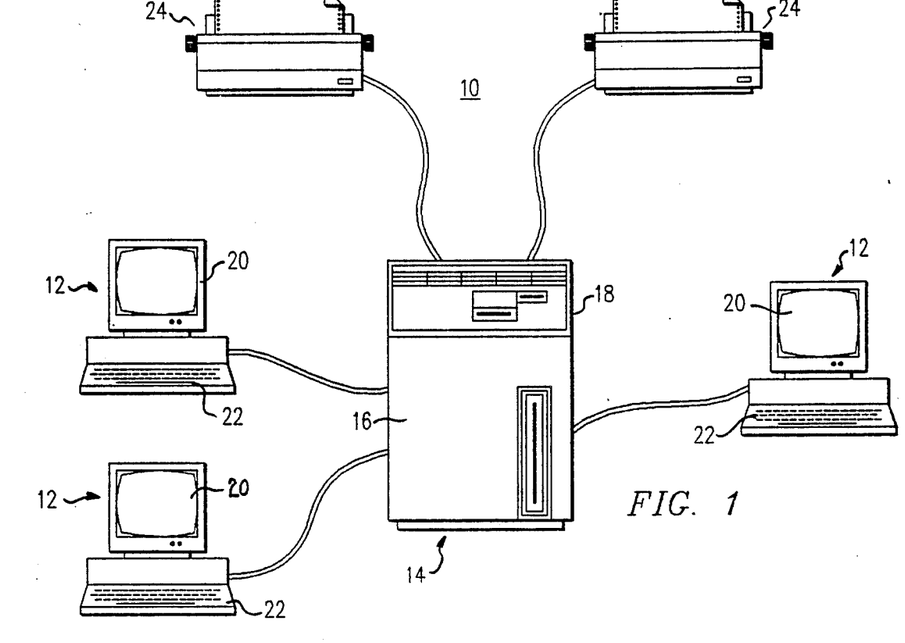
FIG. 1 is a view of the computerized management system constituting the subject matter of the invention.

The microprocessor 18 is, for example, a multiple instruction, multiple data stream (MIMD) parallel processor. Such as the FLEX/32 which uses at least two CPUs that either work independently or concurrently, processing data simultaneously. The Flex/32 basic system consists of two 32-bit superminicomputers based on National Semiconductor Corp.'s 32032 microprocessor having 2 megabytes of local memory, 128 kilobytes of common memory, and two VME bus interfaces mounted in cabinet 14. The system can grow from one computer which is a 32-bit supermini, to 20,480 of those computers all running as a "symphony Orchestra".

Figure 2:
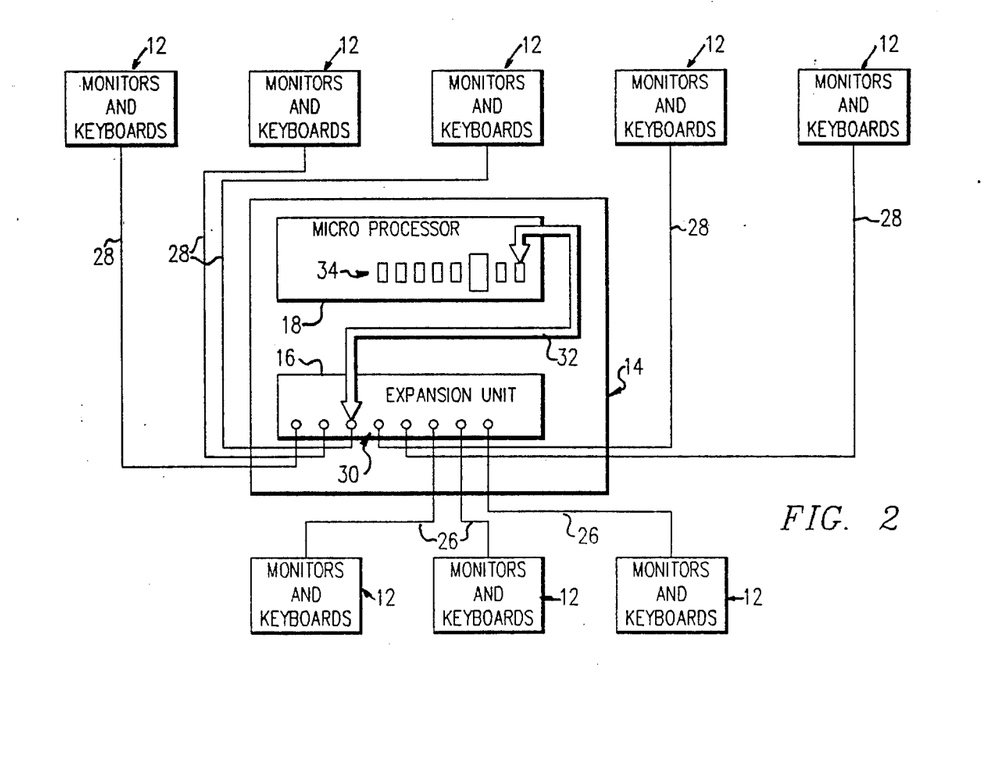
FIG. 2 is a plan view showing the back side of the multiple operating computer housing for the invention.

The work stations 12 are connected by leads 28 to eight input/output ports 30 provided on the backside of the expansion unit 16 mounted in cabinet 14 (FIG. 2). The expansion unit 16 input/output ports include video ports for video cards and parallel printer ports connected by bus 32 to an input/output port of eight input/output ports 34 of the microprocessor 18.

Figure 3:
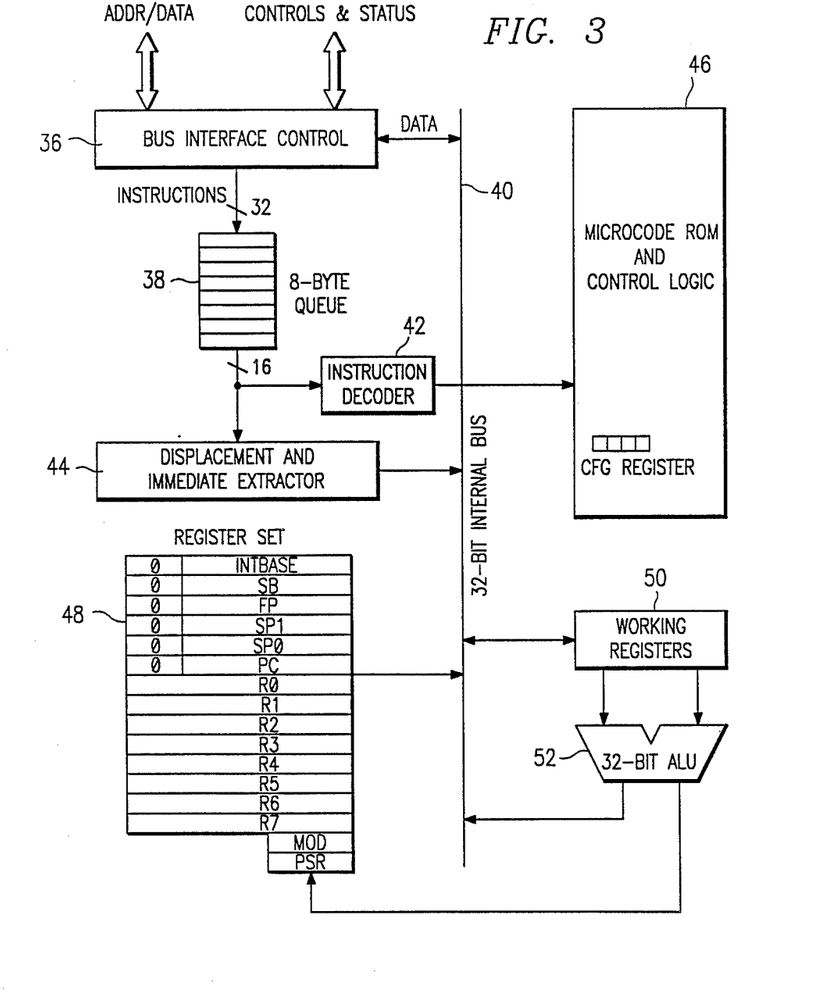
FIG. 3 is a schematic diagram shown in block form of a microprocessor suitable for the invention.

Referring now to FIG. 3, the microprocessor 18 includes a bus interface control 36 connected to an 8-byte queue 38 containing instructions, and in two-way connection to a 32-bit internal bus 40. The 8-byte queue 38 is connected to the junction of an instruction decoder 42 and a displacement and immediate extractor 44. The instruction decoder 42 is connected to a microcode ROM and control logic 46 and the displacement and immediate extractor 44 is connected to the 32-bit internal bus 40. A register set 48 and working registers 50 are connected for two way communication with the 32-bit internal bus. A 32-bit arithmetic logic unit (ALU) 52 is connected to the working registers for processing information pursuant to instructions received and outputting the processed information to the 32-bit internal bus 40 for storage or output to the work stations or both as appropriate.

While FIGS. 1, 2, and 3 demonstrate one hardware configuration, it should be made clear that the nucleon system is machine independent, that is, it is operational in the full spectrum from a single or parallel micro to the largest scale hardware configurations.

Figure 4A:
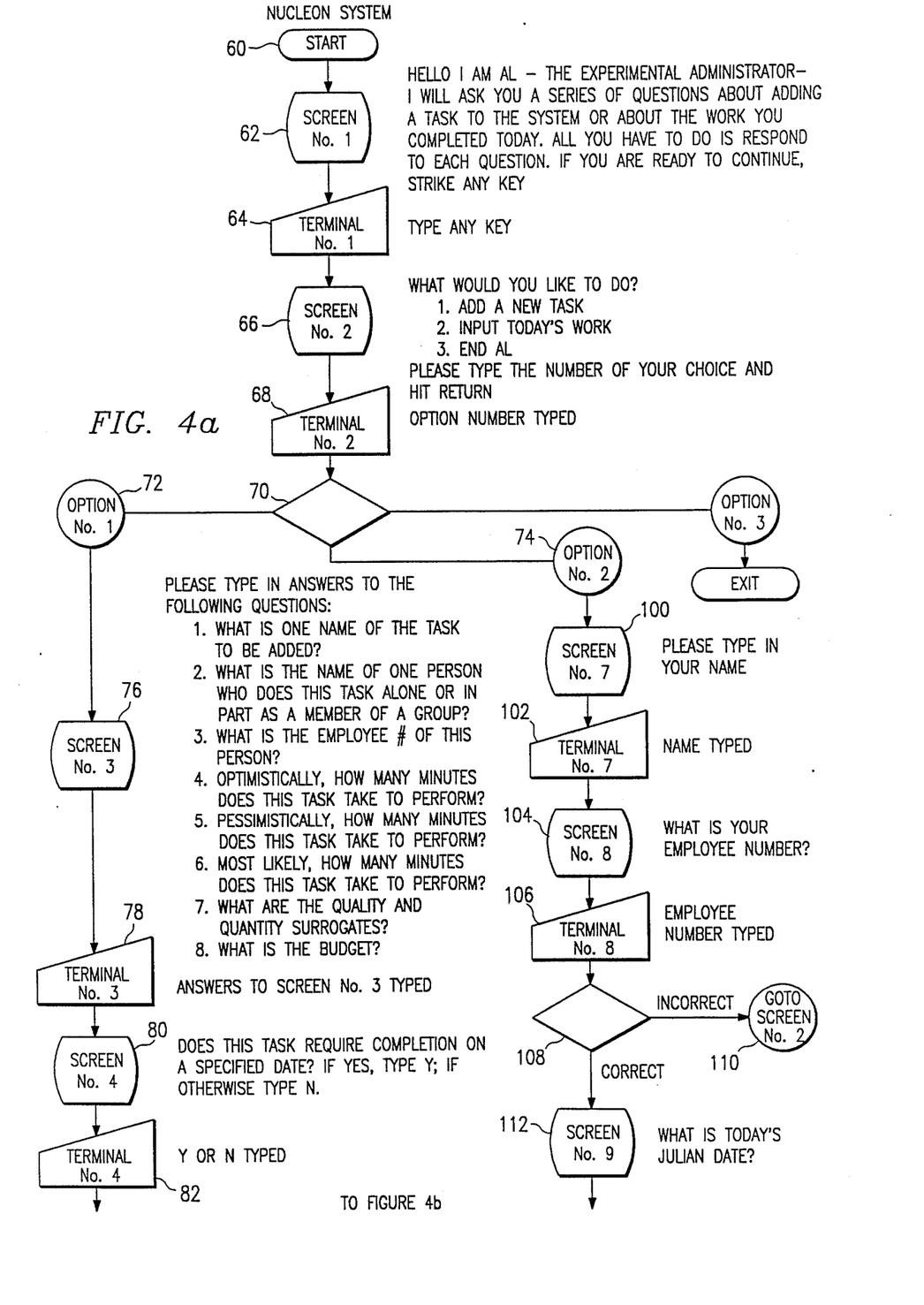
FIGS. 4a, 4b, 4c are flowcharts showing the operation of the Alphus and Beta systems of the invention.
Figure 4B:
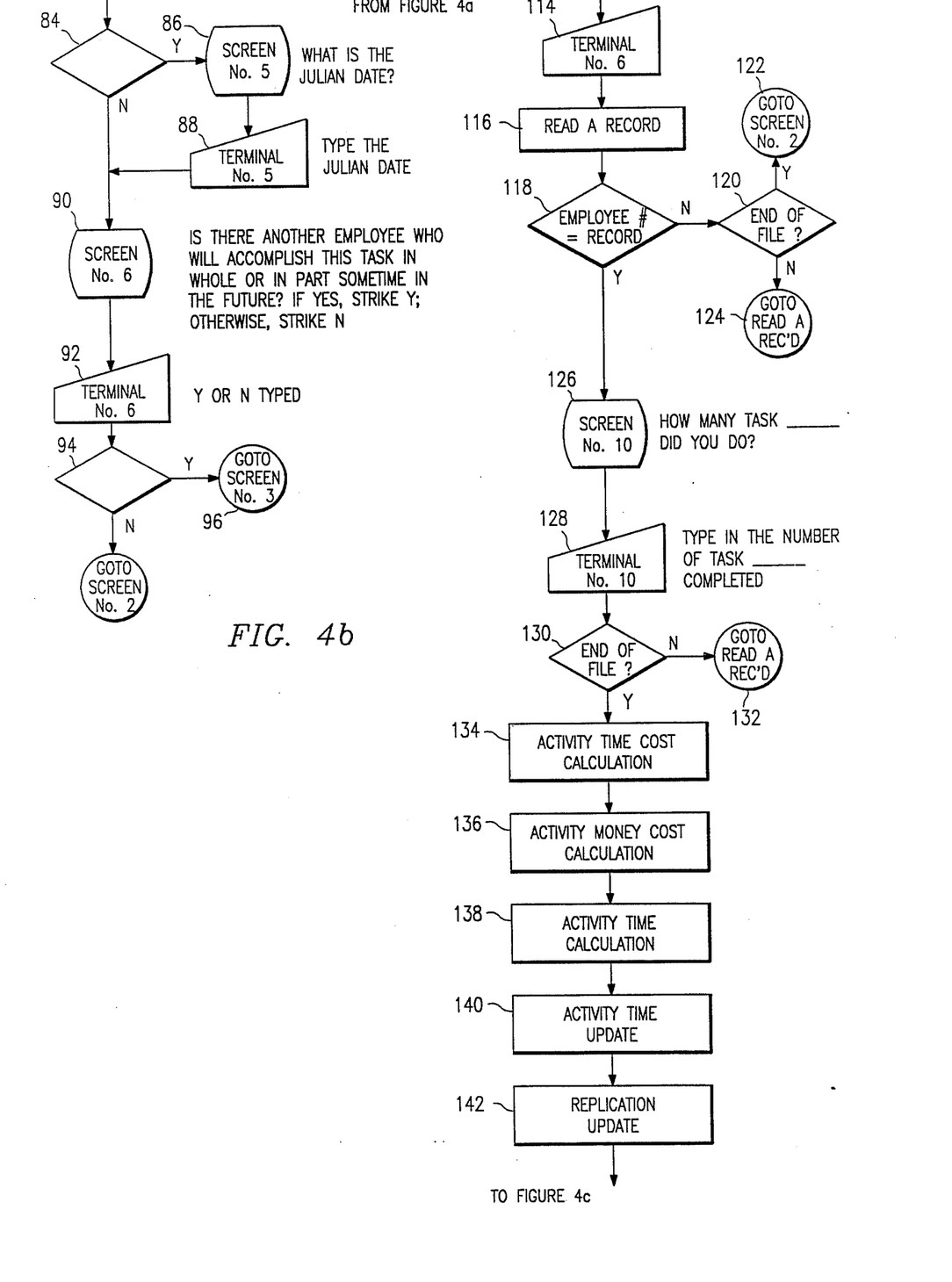
Figure 4C:
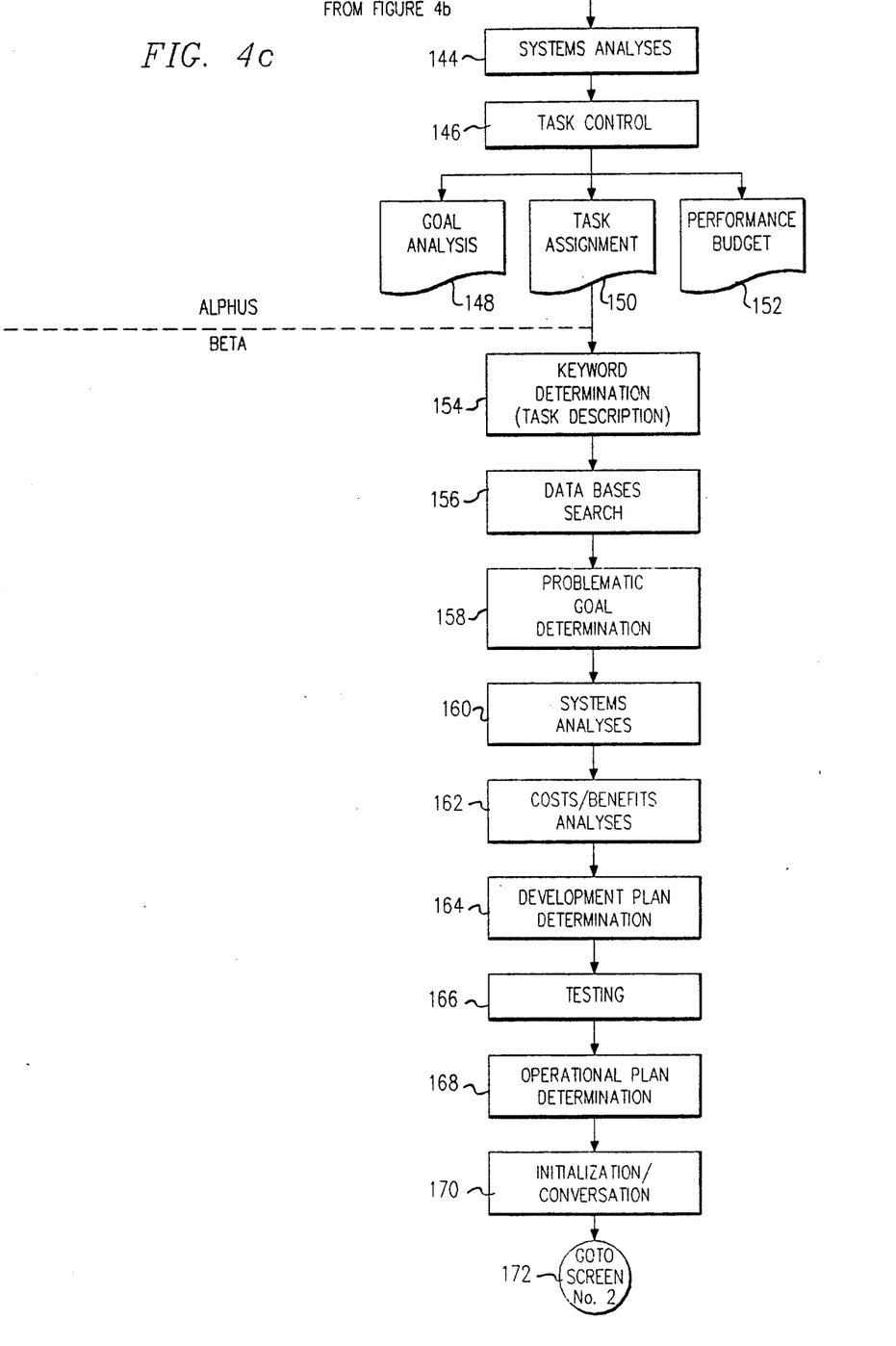

Referring now to FIGS. 4a–4c for a description of the emergence stage (steps 60–96), convergence stage (steps 100–152), proliference stage (steps 154–168), and divergence stage (steps 170 and 172). the instruction means, includes the Alphus (administrative part of the Nucleon system) system (the emergence and convergence stages) and the Beta system (the proliference and divergence stages). The mode of operation of Alphus is shown in detail beginning with FIG. 4a. At start 60 information is input into the system as follows: an instruction 62 is issued to display a friendly message introducing the system to the user. A suitable message is, for example, as follows:

"Hello, I am Al—The experimental Administrator-will ask you a series of questions about adding a task to system or about the work you completed today. All you have to do is respond to each question. If you are ready to continue, strike any key." In response to striking any key 64, an instruction 66 is issued to display a message substantially as follows:

"What would you like to do?
1. Add new task.
2. Input today's work.

3. End Al.

"Please type the number of your choice and hit return."

In response 68, the operator then selects and enters the selected option. Then a decision 70 is made as to which option is made. If option 3 is selected, exit is made; however, if option 1 or 2 is selected, subroutines 72 and 74 are selectively entered for options 1 and 2.

For option 1, an instruction 76 (FIG. 4a) is issued to display a message substantially as follows:

"Please type in the answers to the following questions:
1. What is the name of the task to be added?
2. What is the name of one person who does this task alone or in part as a member of a group?
3. What is the employee number of this person?
4. Optimistically, how many minutes does this task take to perform?
5. Pessimistically, how many minutes does this task take to perform?
6. Most likely, how may minutes does this task take to perform?
7. What are the quality and quantity surrogates?
8. What is the budget?"

In response 78, the operator enters the answer to each question.

Next, an instruction 80 is issued to display a message substantially as follows:

"Does this task require completion on a specific date? If yes, enter Y; otherwise enter N."

In response 82, the operator enters either a "Y" or an "N", and a decision 84 (FIG. 4b) is made whether a "Y" or an "N" was entered. If yes, an instruction 86 is issued to display a message substantially as follows:

"What is the Julian date?"

In response 88, the Julian date is entered.

Then, an instruction 90 is issued or if the decision 84 is No the instruction 90 is issued to display a message substantially as follows:

"Is there another employee who will accomplish this task in whole or in part sometime in the future? If yes, strike "Y"; if no, strike "NO"."

In response 92, the "Y" or "N" key is pressed, and a decision 94 is made whether yes or no was selected. If yes, and instruction 96 is issued to return to instruction 76; otherwise, if no, an instruction is issued to return to instruction 66 and repeat the loop until exit is made (FIG. 4a).

Option 2 begins with an instruction 100 (FIG. 4a) being issued to display a message substantially as follows:

"Please type your name."

In response 102, the user enters his name.

Next, an instruction 104 is issued to display a message substantially as follows:

"What is your employee number?"

In response 106, the employee enters his/her employee number, and a decision 108 is made whether the employee number is correct or incorrect for the name entered. If incorrect, an instruction 110 is issued to return to instruction 66, otherwise, if correct, an instruction 112 is issued to display a message substantially as follows:

"What is the Julian date?"

In response 114 (FIG. 4b), the Julian date is input.

Then, an instruction 116 is issued to read a record; this is the beginning update at the beginning of the file. Next, a decision 118 is made whether the record to be read is for the employee. If not, a decision 120 is made whether the "end of file?" has been reached. The "end of file" refers to the subroutine that terminates the sorting of the master file for the task records that make up the job description of one individual. Such a sort is done on any given day to determine work completed. If yes, an instruction 122 is issued to return to instruction 66 (FIG. 4a); otherwise an instruction 124 is issued to return to instruction 116 and repeat until the employee's file has been found and the answer is yes.

Then, an instruction 126 is issued to display a message as follows:

"How many task_did you do?"

In response 128, the number of tasks completed is entered. Next, a decision 130 is made whether the end of file has been determined. The end of file decision 130 refers to the subroutine that terminates the sorting of the master file for the task records that make up the job description of one individual. Such a sort is done on any given day to determine work completed. If decision 130 is no, an instruction 132 is issued to return to instruction 116 (FIG. 4c); if yes, a plurality of instructions 134, 136, 138, 140, 142 or FIG. 4b, and instructions 144, and 146 (FIG. 4c) are issued sequentially as follows.

Instruction 134 is issued to enter a subroutine for calculating and storing the cost in time of each kind of task completed on any given day in relation to other completed tasks.

Instruction 136 is issued to enter the activity money cost calculation subroutine to calculate the activity money cost. This is the daily activity time cost per task times the equivalent rate of pay for each employee for the same unit of time.

Instruction 138 is issued to enter an activity time calculation subroutine to determine a new activity time using the statistical method.

Instruction 140 is issued to update the activity time. The activity time update is used to change all activity times that were completed on any given day.

Instruction 142 is issued to update replication. Replication update is a subroutine that measures the amount of money that the Alphus system has earned. When the amount is equal to the cost of hardware and software, then Alphus replicates or recreates itself in another part of the organization.

Instruction 144 is issued for a system analysis. System analysis is a dynamic expert-like system that determines if a task is individually random, part of a sequence, or occurs constantly at a specific date. The system analysis subroutine does this by analyses of its past experience to the end that it predicts and directs the next task to be performed, and uses a sensitivity analysis to forget tasks that are no longer required.

Finally, instruction 146 is issued to enter a task control subroutine. The task control subroutine is a general system that ensures that all tasks are performed in a timely manner and that none are missed.

Upon completion of the task control function three reports 148, 150, and 152 are made available. The first report 148 is for a goal analysis; it indicates how many products or services can be produced for the rest of the fiscal period based on the efficiency and effectiveness of any given daily output. The second report 150 is for task assignment; it indicates tomorrows workload, either for a supervisor's use and/or directly to the employee; real time is possible. And the third report 152 is for a performance budget. The performance budget report sets forth the cost in dollars for each product or service which is the performance budget. Once calculated, it is compared with the line item budget for the same period. These reports complete the Alphus system, and the Beta (anticipation) system (FIG. 4c) begins.

The Beta system consists of a plurality of instructions 154, 155, 158, 160, 162, 164, 166, 168, and 170.

Instruction 154 is issued for entering a subroutine for keyword determination. Keyword determination is the use of the task description to identify those words that can be used as descriptors in data base searches.

Instruction 156 is issued for entering a data base search routine. A data base search is used to determine the literature and authors who are expert in the described tasks.

Instruction 158 is issued for entering a problematic goal determination subroutine. The problematic goal determination refers to the use of automated Delphi techniques to identify problematic goals in a given task or task area. Delphi is a decision-making technique.

Instruction 160 is issued for entering a systems analysis routine. This systems analyses is for the deductive determination of new or revised tasks, again by automated Delphi.

Instruction 162 is issued for entering a costs/benefits analyses subroutine. The costs/benefits analyses subroutine is used to determine the most efficient and effective new approach.

Instruction 164 is issued for entering a development plan determination subroutine. The development plan determination subroutine is for developing the new or revised tasks, their time frame, and performance budget.

Instruction 166 is issued for entering a task testing subroutine. Testing is performed by the old or new staff, and the results of the new methods are compared with the old for task evaluation.

Instruction 168 is issued to enter an operational plan determination subroutine. The operational plan determination results from the optimal of those tested tasks being put into an operational file (Alphus).

Finally, instruction 170 is issued to enter an initialization/conversion subroutine. Initialization/conversion occurs when the new or improved tasks are made ready for implementation.

After completion of the Beta system instructions return 172 is made to Alphus instruction 66 and the Alphus routine repeated.

OPERATION

Inasmuch as the computerized management system of the present invention follows the management format of Emergence (steps 60–96, FIG. 4a), Convergence (steps 100–152, FIGS. 4a–4c), Proliferation (steps 154–168, FIG. 4c), and Divergence (steps 170 and 172, FIG. 4c) derived from the sciences, the operation is discussed in relation thereto.

The initial interaction begins with a rule-based protocol for conducting an interrogative dialogue with the person-in-charge of any subdivision. Regardless of who activates the computer, the system seeks such a person. Its purpose is to produce a certain copy of the subdivision's present plan for internal machine-intelligent use.

EMERGENCE

Control System

Initialization of the computer is followed by inputting into a file a schedule of the tasks to be performed. The scheduling of tasks is similar to the typical industrial project management control system. It differs in two ways from the industrial project management control system, which focuses on sequential tasks required to accomplish a single or multiple project. First, the schedule must include both tasks and services that occur singularly or in a group. Groups of tasks/services that are sequential are initiated at absolute, estimated, or random times. Their following ordered individual tasks/services may begin at absolute or estimated times. Such individual tasks/services may be entered conditionally as well, that is, the sequence may differ based on a previously determined variable order.

The work elements may also be a menu or an array of entirely random, single tasks/services. Finally, single or groups of tasks/services can be prioritized, including those that are random. The interrogative dialogue seeks the information required to make these differentiations.

The second difference involves the use of Julian dates. The Julian date refers to a specific number for a given day resulting from the sequential numbering of the days of the year beginning with January 1 as 001 to December 31 as 365 (366 for leap years).

Based on Julian dates, the subdivision calendar is determined by interrogation for any future period. Non-working days, holidays and weekends are excluded from this effort; but annual leave, sick leave, and leave-without-pay days for specific individuals are designated separately on a day-by-day basis.

The resulting calendar is a file that is then updated with certainty, both absolutely and dynamically with estimated dates for tasks/services. The latter dates are determined by the AT formula based on the estimated cost in time of each task/service. Random tasks/services cannot be scheduled. On any given day the calendar for that day, consisting as it does of absolute and estimated tasks/services to be initiated, will be relied upon to direct the individuals in the subdivision to perform specific tasks/services. (The total of all types of tasks/services performed by an individual equals that person's job description.)

Operational/Support System

In addition to the information required for the calendar (the names of the work elements and the cost in time for all tasks/services), the interrogative dialogue determines all the other information needed to complete the plan:

1. quality and quantity goal surrogates;
2. work element descriptions and the name of the employee responsible for the completion and reporting of each task; and
3. performance budget as well as line item budget if applicable.

During the course of the interrogation, the expert system is to answer, upon demand, certain questions about how to do the systems analysis. In short, a plan of the operational/support activities is produced in the same general format as the handwritten type, except this plan is for machine use only.

CONVERGENCE

Plication

With the work elements, their schedule, the employees by name and job description, the system determines by priority each person's tasks/services for the day including work started but not completed the previous day, the absolute scheduled tasks/services, and the estimated dynamically scheduled tasks/services.

When the employees arrive for work, each person reports through the input/output device and receives the first task he is to perform that day. If work of a higher priority is inputted, the scheduling is revised by the system.

At the end of the employee's work period, the system will have optimally controlled the period's schedule of operational/support activities. The employee then inputs verification and other data needed to evaluate the work period, in response to prompts. Each person is requested to verify or list the tasks/services performed. The verification includes all absolute or estimated scheduled tasks/services performed during the period. In addition the system calls for a listing of all random tasks/services begun but suspended and for those commenced but not completed. In both these cases the employee receives a prompt for an estimate in percentages of the portion of the tasks/services completed. Tasks/services, that take more than one day to complete also fall into this category. This number of completed and partially completed tasks/services, after being related to their cost in time, is the source factor for all control.

Control (Time/Cost)

After the employees have completed their daily work period, instructions are issued to calculate the relative time/cost for all tasks/services. The original cost in time for all tasks/services is measured in minutes as a result of information determined by the initial interrogative dialogue. Activity Time Cost (ATC) is originally calculated using:

$$ATC = [a(\text{optimistic}) + 4b(\text{most likely}) + c(\text{pessimistic})]/6$$

The ATC formula is also used for calculating the daily time/cost of the jobs completed for each day. The estimated time for performing the tasks/services completed each day is compared to the actual time and the percentage above or below the estimate computed as an experience factor for correcting the job estimates.

Control (Money/Cost)

Next, the cost of such tasks are calculated. These costs can also be recorded in an experience base and used as values in the same type of equation, e.g. Activity Money Cost (AMC)=$(a+4b+c)/6$. It will be appreciated that more complex statistical and other mathematical means can be used where desired.

Control (Scheduling)

As the estimated sequential tasks/services are the only type that can be dynamically rescheduled, the time/cost for each such task/service is used to recalculate the ATC for each estimated task/service and using the new ATC's to change the calendar.

Total (Quality/Quantity)

After computing the efficiency data, instructions are issued to determine the effectiveness data for each day. The clue to quality problems is the suspended task/service. Even though an individual may complete the tasks/services in question, the suspension is a future target for quality improvement. For quantity control, instructions are issued to determine the accumulated results of tasks/services, singly or in groups for comparison to the quantity goal surrogates on a daily basis.

Replication

After the initial plication, instructions are issued for determining the amount of time and money savings daily for product evolution.

Configuration

After determining the amount of time and money savings resulting from the improved efficiency, instructions are issued to engage a different systematic entity using the time and money savings.

PROLIFERENCE

From the files provided, the specifications and quantitative goals of an improved model of the present product can be produced, and instructions are issued to return to Alphus for scheduling the tasks for a feasibility study for the new model. In other works, Alphus administers the anticipatory tasks. It should also be noted that the system is capable of starting de novo with Beta if no ongoing organization exists.

Feasibility Study

The feasibility study begins with the system analysis instruction. The output of this study is a development plan, which is a document that follows a proposed course of action that can be tested. The plan includes, like any operational plan, a scope, work elements, time frame, resource allocation, and appendices. It will also indicate any new resources that will be needed in addition to present resources that can be redeployed. Beta using the development plan including the schedule contacts the individuals involved to validate the proposed job descriptions and material expectations. Those resources not presently available will be specifically identified, and the subdivision's supervisor will be responsible for the validation of their expected task-by-task efficiency and effectiveness. Instructions are then added to prepare a preface for a development plan. The beginning part of the plan concerns the initialization or conversion of the development plan into an operational plan. Initialization takes place only when a completely new set of resources is needed; otherwise a conversion occurs utilizing present resources. Some plans are a mixture of the two. Beta, through Alphus, requests that the supervisor prepare this beginning section for the development plan. This section of the development plan will become operational only if the development plan reaches fittest implementation.

External Funding

Instructions are then issued to determine whether additional funding is to be added. The availability of funds is determined by the market place value system of the product.

Maturation

Testing of such subdivisional development plans is conducted when sufficient external funding is available to fund the test. The development plan is tested by actual or simulated performance through complete cycles, establishing the plan's level of efficiency and goals-accomplishment effectiveness. The fitter development plan of each subdivision fills the proposed niche.

DIVERGENCE

The fittest of the subdivisional development plans, which has ceased to change, decouple and come together in a concentrated form that is now a new organizational policy. Instructions are then issued to begin initializing or converting. Thus, the new plans are implemented.

BASIC RESEARCH

From the above, it is certain from a management viewpoint that the process of basic research can be computerized using the scientific method for:
1. Selecting and stating a problem;
2. Expressing the proposed resolution of the problem as an hypothesis;
3. Collecting, observing, and arranging pertinent facts;
4. Testing and validating the hypothesis, if possible;
5. Resolving the problem, if possible; and
6. Reporting the conclusions, whatever.

Four possible conclusive results are possible:
1. Yes, the problem is resolved; such conclusion is hard to achieve;
2. Not at this time; this answer is in lieu of an absolute no;
3. Further study; this result may occur because of a scope too narrow or too broad, or even because of additional possibilities suggested by success or failure;
4. Restudy; this conclusion usually results from a flawed research effort.

Some of these conclusions are sequential answers in ongoing research situations. Finally, the reporting of findings, even of failed results, is important. If the basic research process can be administered, then the product can be oral and/or written results.

By using the words that explain the product generally (scope of the plan) and each task/service specifically (job descriptions) as descriptors (nouns and verbs including the modifiers of each), Beta starts the transition from internal to external informational emphasis by searching all pertinent data bases.

When the pertinent articles are found, the names of the authors are retrieved. These names are used as input to another data base called Citations, which references the number of publication sources in which such authors were cited. By using the information in Citations, Beta rank orders each author's publications by quality and quantity of publication. Those authors that show a steady stream of publication over time probably reflect the conventional wisdom and not much in the way of discovery. But, those authors just beginning or having erratic publishing records are most likely to show accidental sagacity. After identifying and locating those less conventional authors (using other data bases), Beta contracts, with these individuals to define new intermediate or final quality specifications for new or improved tasks or products. Such goals may fail later in applied research and development, but basic research will be conducted over and over again until discovery in the form of new practical goals are identified.

APPLIED RESEARCH

In applied research, all relevant authors may have a contribution. Thus, the more conventional may be used collectively to do a feasibility study. The systems analysis for such a study of newly discovered goals is accomplished using an automated Delphi.

Delphi is a decision-making technique developed by RAND Corporation. The automated version avoids the face-to-face negative group dynamics as well as the expenses of bringing people together. In this case, the systems analysis protocol is followed, allowing all participants to contribute to the deductive results. Given a variety of approaches the cost/benefit analysis is performed to determine the best course of action.

DEVELOPMENT

Beta has the capability of developing abstract models of customer/clients needs and the means to satisfy those needs. The form of this ongoing model is the development plan; the needs are expressed in the scope (goals) and the remainder of the development plan expresses the means.

SUMMARY

In summary, the key to total systems is feedback. The acquisition of knowledge is only the first part of intelligence; the application of such knowledge is just as important. Cost in time and money is now used to determine whether the planned time and money objectives are being achieved. Such performance evaluation is better because evaluations using only line item budgetary information can deal only with fixed product demands. By using cost information the system of this invention can determine whether the operational/support tasks/services are achieving an improved efficiency, which can be calculated as a learning/experience curve. Such progress is usually illustrated an an "S" curve, but it is better exemplified as a paradigmatic helix around the constancy of time. Thus, the evolution of an organization or its individual products can be tracked along the expected trajectory of the paradigm.

Savings in time/money are not only the triggers for future anticipation but also the coin by which such actions are funded. The system's calendar and experience curves predicts when time can be devoted to such research. Thus, the system achieves, the necessary control of time/costs, money/costs, and time scheduling for dynamic, reflexive administration.

Although, only a single embodiment of this invention has been described, it will be apparent to a person skilled in the art that various modifications to the details of construction shown and described may be made without departing from the scope of this invention.

What is claimed is:
1. A computerized management system comprising:
computing machinery (12-52) for automatically managing an organization, said computing machinery including:
an input/output means (16, 28-34) for communicating management related information from an external source (12) to a computer (18) or from the computer to the external source; and
a computer (18) connected to the input/output means for processing continuously the management related information for the continuous management of the organization;
said computer including a working register (50) for storing information and a control means (36-44) having: first instruction means (60-96) for receiving and processing the management related information received from the external source through an emergence stage for producing an organization task/service management plan for an objective in machine language for the objective for storage;
second instruction means (100-152) for processing the plan through a management convergence stage for generating subdivisional plans for communica- tion through the input/output means to the external source for reducing the objective to a reality in a controlled manner and for receiving information from the external source relating to objective achievement;

third instruction means (154–168) for processing the management related information including the information generated during the emergence and convergence stages through a proliference stage for generating specifications and quantitative goals for a new version of the objective for processing by the first and second instruction means through the emergence and convegence stages; and fourth instruction means (170–172) for processing the management related information including information generated during the emergence, convergence, and proliference stages through a divergence stage for producing an organizational policy.

2. A computerized management system according to claim 1 wherein the first instruction means for receiving and processing the management related information for the emergence stage includes interrogative means (72–94) for conducting an interrogative dialogue with the external source for receiving for the plan a schedule of tasks/services to be performed, information for estimating each task/service performance time, names of specific individuals performing each task/service, and calendar information for developing subdivisional plan schedules based on Julian dates for filing in the register by the control means.

3. A computerized management system according to claim 2 wherein the interrogative means of the first instruction means further includes instruction means 76, 78 for conducting an interrogative dialogue with the external source for determining additional information for the plan including (a) quality and quantity goal surrogates, (b) budget information including information for a performance budget.

4. A Computerized management system according to claim 1 wherein the second instruction means for processing the plan through a management convergence stage includes: instruction means (100, 104, 66, 112, 126,) for conducting an interrogative dialogue with the external source for receiving for the plan a schedule of the tasks/services to be performed, information for estimating each task/service performance time, task/service priority, names of specific individuals performing each task/service, and calendar information for developing a subdivisional schedule based on Julian dates; means (116, 122, 124) for filing the subdivisional schedule; and means (108, 110, 112, 116) for receiving the name and Julian date of a person, calling up the tasks/services to be performed by that person and reading out the efforts of the individual on a day to-day basis, and receiving and entering in the employee's record the status for the performance of the scheduled tasks/services.

5. A computerized management system according to claim 4 wherein the second instruction means for processing the plan through a management convergence stage further includes: means (134) for calculating original activity time cost (ATC) for all tasks/services for daily work periods; means (136) for calculating activity money cost (AMC) for all of the tasks/services; means (138) for recalculating the ATC for sequentially performed tasks/services; means (140) for determining quality/quantity effectiveness data for each day; and means (142) for determining amount of time and money savings daily for product evolution.

6. A computerized management system according to claim 5 wherein the third instruction means for processing the management related information including the information generated during the emergence and convergence stages through a proliference stage includes: (a) means (160–162) for conducting system analysis for producing a development plan for testing and for determining that the development plan reaches the most efficient and effective implementation; (b) means (164) for indicating tasks/services for each succeeding work day; and (c) means (166) for preparing budget reports for testing the plan performance through complete cycles for establishing the plan's level of efficiency and goals-accomplishment effectiveness.

7. A computerized management system according to claim 1 wherein the fourth instruction means of processing the management related information including information generated during the convergence and proliference stages through a divergence stage includes means (170) for decoupling and bringing together in a concentrated form the most effective and efficient subdivisional development plans as an organizational policy.

8. A computerized management system according to claim 1 wherein the system is applicable to an objective selected from a group consisting of basic research, applied research, and development.

* * * * *